F. E. FRITZ.
METHOD OF MAKING PLATES OF LINOLEUM COMPOSITION FOR PRODUCING BLOCKS FOR THE MANUFACTURE OF CONTINUOUSLY GRAINED LINOLEUM.
APPLICATION FILED DEC. 6, 1910.
1,001,836. Patented Aug. 29, 1911.
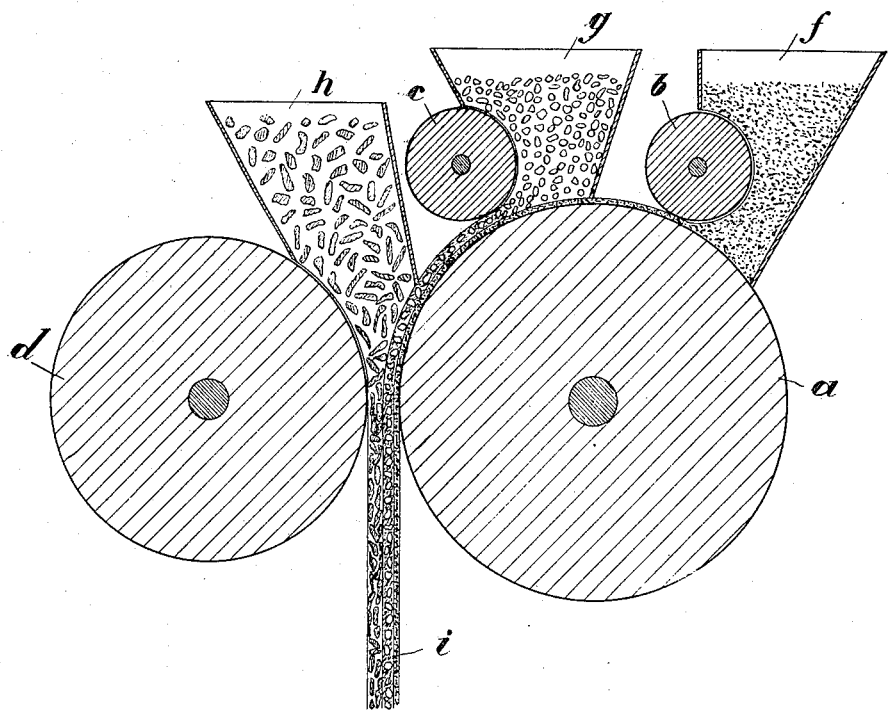

UNITED STATES PATENT OFFICE.

FELIX EWALD FRITZ, OF DELMENHORST, GERMANY, ASSIGNOR TO SOCIETY BREMER LINOLEUMWERKE DELMENHORST, OF DELMENHORST, GERMANY.

METHOD OF MAKING PLATES OF LINOLEUM COMPOSITION FOR PRODUCING BLOCKS FOR THE MANUFACTURE OF CONTINUOUSLY-GRAINED LINOLEUM.

1,001,836.     Specification of Letters Patent.     Patented Aug. 29, 1911.

Application filed December 6, 1910. Serial No. 595,904.

*To all whom it may concern:*

Be it known that I, FELIX EWALD FRITZ, a subject of the German Emperor, residing at Delmenhorst, in the Grand Duchy of Oldenburg, Germany, have invented certain new and useful Improvements in Methods of Making Plates of Linoleum Composition for Producing Blocks for the Manufacture of Continuously-Grained Linoleum, of which the following is a specification.

Many kinds of wood have different grainings next to each other, so for instance short and long veins may appear in numerous shapes and forms at the same time.

It is the object of the present invention to enable the production of such continuous wood-grains also in linoleum.

The present invention is based on the known method of making blocks of linoleum composition by piling slightly rolled plates of granular linoleum composition on each other and cutting the final linoleum plates transversely off this block.

According to the present invention the linoleum composition plates which are to be piled up so as to form a block are not simply rolled homogeneously of so-called granitoid composition, as the plates cut transversely from such blocks are extremely homogeneous and do not show any great variation in the patterns of the veins, but said linoleum composition plates to be piled to a block are rolled of several differently treated linoleum compositions, namely of granular composition, composition molded in the shape of sausages or similar bodies and of bodies consisting or two or more compositions of different color prepared in known manner according to the German Patent No. 171,111, whereby the first or last of these compositions may also be omitted. The several differently prepared compositions are not rolled together all at the same time, but first one of the differently prepared compositions is slightly rolled between two rollers, then the second prepared composition is slightly rolled over such first composition and over these two a third prepared composition is slightly rolled.

The accompanying drawing diagrammatically exemplifies a constructional form of an arrangement for carrying out the method forming the subject matter of the present invention.

$a$ is a main roller, around which are arranged the secondary rollers $b, c$ and $d$. Into the hopper $d$ is filled say a granular linoleum composition and rolled slightly between the main roller $a$ and the secondary roller $b$. Into the second hopper is filled a linoleum composition consisting of self colored composition sausages or similar bodies the various self colored sausages or the like differing in color between each other, which sausages or the like are prepared in known manner of two or more compositions of different colors or tints. Between the secondary roller $c$ and the main roller $a$ these sausages or the like will be rolled to a second layer over the first layer rolled between the roller $b$ and the main roller $a$. Into the third hopper $h$ is filled a composition which may consist say of two or more granular compositions of different colors so loosely connected with each other, that the several compositions are not yet mixed up or incorporated in each other according to German Patent No. 171,111, whereupon this third charge is rolled between the roller $d$ and the main roller $a$ to a third layer on top of the first roller. If the thus obtained combination bands are piled in known manner to a block, and plates are transversely cut off this block, these plates will show the desired variations in the grain with long and short designs. These designs will be chiefly produced by the slightly prepared composition sausages or the like employed in making the compound bands, which sausages or bodies are more or less deeply embedded during the rolling operations into the previously but slightly rolled composition layers, and will therewith displace the respective material.

Compound bands $i$ may also be made of only two of the hereinbefore mentioned compositions, of a granular composition and a composition consisting of sausage or similarly shaped bodies, or of the latter and multicolored composition bodies obtained in known manner according to German Patent No. 171,111. The designs may be still further varied by changing the series in which the differently treated compositions are employed in making the compound bands $i$; so for instance the lowermost layer may be made of sausage shaped bodies, the next one of granular composition or in any other series. Instead of self-colored granular composition also a mixture of different colors or tints may be employed.

I claim:

1. The herein described method of making plates of linoleum composition, consisting in rolling several differently prepared linoleum compositions of ordinary granules successively on top of one another.

2. The herein described method of making plates of linoleum composition, consisting in rolling several differently prepared linoleum compositions of ordinary granules successively on top of one another, and forming one of said compositions prior to its being rolled into the shape of loose sausage like bodies.

3. The herein described method of making plates of linoleum composition, consisting in rolling several differently prepared linoleum compositions of ordinary granules successively on top of one another, in forming one of said compositions prior to its being rolled in the shape of loose sausage like bodies, and in forming another of said compositions prior to its being rolled of differently colored loosely connected masses.

In testimony whereof I have affixed my signature in presence of two witnesses.

FELIX EWALD FRITZ.

Witnesses:
HERMANN PIETSCH,
ALBERT LOHR.